(12) United States Patent
Eckart et al.

(10) Patent No.: US 9,205,619 B2
(45) Date of Patent: Dec. 8, 2015

(54) MULTIPLE-SCREW EXTRUDER

(75) Inventors: Ludwig Eckart, Traunstein (DE);
Werner Bamberger, Traunstein (DE);
Michael Baumeister, Traunstein (DE);
Günter Oedl, Salzburg (AT)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 1260 days.

(21) Appl. No.: 13/000,251

(22) PCT Filed: May 27, 2009

(86) PCT No.: PCT/EP2009/003779
§ 371 (c)(1),
(2), (4) Date: Feb. 2, 2011

(87) PCT Pub. No.: WO2009/152936
PCT Pub. Date: Dec. 23, 2009

(65) Prior Publication Data
US 2011/0128812 A1 Jun. 2, 2011

(30) Foreign Application Priority Data
Jun. 19, 2008 (DE) .......... 10 2008 029 130

(51) Int. Cl.
*B28C 1/16* (2006.01)
*B30B 11/24* (2006.01)
(Continued)

(52) U.S. Cl.
CPC ........... *B30B 11/241* (2013.01); *B29C 47/0801* (2013.01); *B29C 47/0803* (2013.01);
(Continued)

(58) Field of Classification Search
CPC ........ B29C 47/402; B29C 47/50; B29C 47/40
USPC ............................................. 366/83, 84, 100
See application file for complete search history.

(56) References Cited

U.S. PATENT DOCUMENTS 3,734,635 A * 5/1973 Blach et al. ..................... 366/85
3,924,835 A * 12/1975 Hohnfeld et al. ............. 366/293
(Continued)

FOREIGN PATENT DOCUMENTS

AT 391 834 12/1990
DE 21 15 144 10/1971
(Continued)

OTHER PUBLICATIONS

International Search Report for PCT/EP2009/003779, mailed Feb. 10, 2010.
(Continued)

*Primary Examiner* — Tony G Soohoo
*Assistant Examiner* — Anshu Bhatia
(74) *Attorney, Agent, or Firm* — Nixon & Vanderhye P.C.

(57) ABSTRACT

An improved multiple-screw extruder, in particular a twin-screw extruder comprises a housing. Several housing bores are located in at least one section within the housing. The housing bores overlap at least along a partial axial length of the housing. One extruder screw is arranged in each of the several housing bores. At least two motors are provided for the at least two extruder screws. A synchronizing and torsion transmitting device, by means of which both cooperating extruder screws can be synchronized, is provided on both the inlet side and the discharge side.

26 Claims, 7 Drawing Sheets

Figure 1:
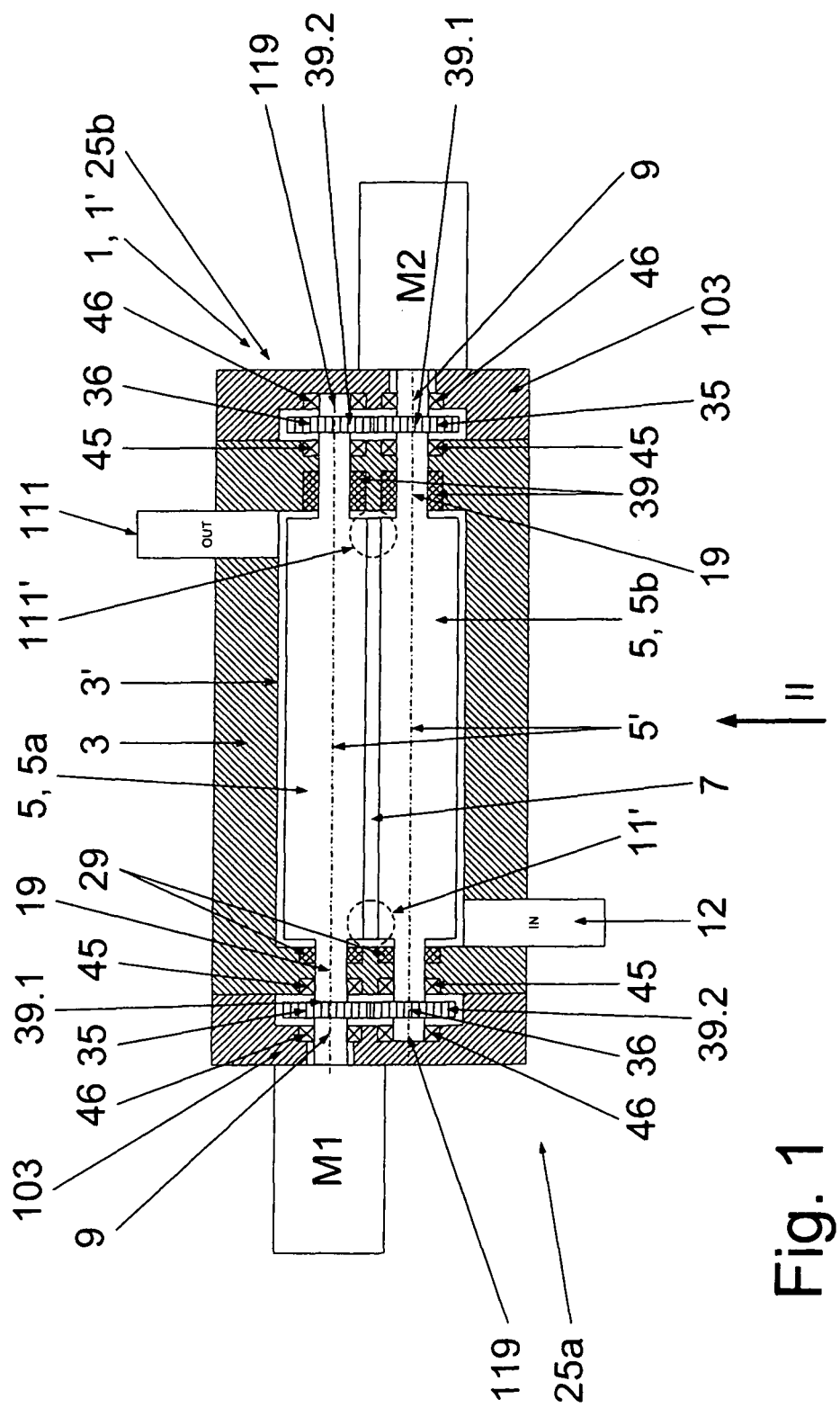

(51) Int. Cl.
*B29C 47/08* (2006.01)
*B29C 47/42* (2006.01)
*B29C 47/00* (2006.01)
*B29C 47/38* (2006.01)
*B29C 47/40* (2006.01)

(52) U.S. Cl.
CPC ........... *B29C47/0805* (2013.01); *B29C 47/404* (2013.01); *B29C 47/42* (2013.01); *B29C 47/0021* (2013.01); *B29C 47/0023* (2013.01); *B29C 47/38* (2013.01); *B29C 47/40* (2013.01)

(56) References Cited

U.S. PATENT DOCUMENTS

| | | | |
|---|---|---|---|
| 4,022,440 A | | 5/1977 | Kawamura et al. |
| 4,521,026 A | | 6/1985 | Eide |
| 4,586,402 A | | 5/1986 | Schaefer |
| 4,695,240 A | | 9/1987 | Li et al. |
| 5,429,435 A | * | 7/1995 | Blach ............................ 366/83 |
| 6,502,977 B1 | * | 1/2003 | Capelle ........................... 366/77 |
| 2007/0019500 A1 | | 1/2007 | Iwai et al. |

FOREIGN PATENT DOCUMENTS

| | | |
|---|---|---|
| DE | 20 40 065 | 2/1972 |
| DE | 32 43 343 | 5/1984 |
| DE | 33 25 395 | 1/1985 |
| DE | 41 29 913 | 3/1993 |
| DE | 44 30 176 | 2/1996 |
| DE | 296 11 411 | 10/1996 |
| DE | 101 32 002 | 2/2003 |
| DE | 101 62 076 | 6/2003 |
| DE | 10 2006 060 739 | 6/2008 |
| EP | 0 084 668 | 8/1983 |
| EP | 0 775 569 | 5/1997 |
| EP | 1 249 608 | 10/2002 |
| EP | 1 454 733 | 9/2004 |
| EP | 1 839 840 | 10/2007 |
| FR | 96 593 | 1/1973 |
| GB | 892 506 | 3/1962 |
| GB | 2 116 866 | 10/1983 |
| JP | 50-44969 U | 5/1975 |
| JP | 54-1503 B1 | 1/1979 |
| JP | 2000-64342 | 8/1998 |
| JP | 10-264233 A | 10/1998 |
| JP | 2007-269026 A | 10/2007 |
| WO | WO 2007/059547 | 5/2007 |

OTHER PUBLICATIONS

Japanese Official Action, Mailing No. 693843, Mailing Date: Oct. 29, 2013, issued in corresponding Japanese Application No. 2011-513901.

* cited by examiner

MULTIPLE-SCREW EXTRUDER

This application is the U.S. national phase of International Application No. PCT/EP2009/003779 filed 27 May 2009, which designated the U.S. and claims priority to German Application No. DE 10 2008 029 130.7 filed 19 Jun. 2008, the entire contents of each of which are hereby incorporated by reference.

The invention relates to a multiple-screw extruder, in particular a double-screw extruder, according to the preamble of claim 1.

Extruders in general and double-screw extruders in particular are well known. They are used in particular for plasticizing plastics material which can then be further processed in a subsequent step. Such extruder arrangements are also used, for example, for producing plastics films, the plasticized plastics material which is discharged from the extruder being able to be processed by means of a cooling roller and a subsequent stretching arrangement to form a plastics film.

In multiple-screw extruders generally and double-screw extruders in particular, the individual extruder screws are generally driven by means of a motor gearing unit. This is necessary in order to drive the extruder screws synchronously within narrow tolerances.

There is generally provided for that purpose a correspondingly large motor, downstream of which there is connected a gearing arrangement as mentioned, by means of which it is possible to distribute force between the individual extruder screws and it is possible to confer on the extruder screws the desired direction of rotation.

Such gearing arrangements can be constructed, for example, in such a manner that a drive shaft of a motor arrangement distributes the torque directly to a first output shaft which is associated with an extruder screw and, via an intermediate wheel, to a second output shaft which rotates in the same direction, by means of which a second extruder screw is caused to rotate. In that case, for example, a so-called synchronous double-screw extruder would be involved.

Another preferred embodiment is a so-called contra-rotating double-screw extruder, wherein the screws rotate in opposite directions by means of the gearing and the geometry of the screws is adapted accordingly.

In principle, EP 0775569 A1 disclosed a double-screw extruder which constitutes a device of the type mentioned in the pre-characterizing clause of claim 1. That example sets out two extruder screws which taper in a conical manner and which are arranged at a slight angle, that is to say, not parallel relative to each other, and whose rotating screws overlap in a central portion and co-operate with each other. A drive motor which causes the relevant screw to rotate is associated with each extruder screw at the same side. A gear-wheel is provided between the two extruder shafts and the motors, respectively, so as to be supported on a drive shaft, the two gear-wheels associated with the two extruder shafts engaging with each other. Therefore, a synchronization device is provided for the two rotors by those two gear-wheels in order to ensure that the two extruder screws co-operate with correct rotation and the two screws which engage with each other cannot collide with each other.

Unlike that prior art, the two extruder shafts may also be arranged parallel with each other, the diameter of the rotating helical screws not tapering from the driving side in that case.

Accordingly, an object of the present invention is to provide a multiple-screw extruder in general and a double-screw extruder in particular, wherein it is possible to drive a plurality of extruder screws, that is to say, at least two extruder screws, with relatively little complexity. The synchronous speed of the screws is also intended to be able to be kept within very narrow tolerances at different operating moments.

The object is achieved according to the invention in accordance with the features set out in claim 1. Advantageous constructions of the invention are set out in the dependent claims.

According to the invention, a synchronization and torsion transmission device is provided between the two screw axes, firstly at the inlet side and secondly at the discharge side. That synchronization and torsion transmission device preferably comprises two mutually engaging gear-wheels in the case of a non-synchronous double-screw extruder and preferably comprises three mutually engaging gear-wheels in the case of a synchronous double-screw extruder, one gear-wheel being connected in a rotationally secure manner to one extruder shaft and one gear-wheel being connected in a rotationally secure manner to the other extruder shaft.

Therefore, a force transmission which also serves to bring about the desired synchronization is also always carried out via those gear-wheels.

It is further provided that a corresponding number of motors is provided for the corresponding number of extruder screws, at least one motor being associated with each extruder screw.

There is preferably provision, in a double-screw extruder, for one motor to be connected with direct driving to the first extruder screw, for example, at the inlet side of the screw extruder, and for a second motor to be connected to the second extruder screw at the discharge side via a direct drive.

The direct drives mentioned and the synchronization and torsion transmission device are supported by bearings, the bearings preferably being able to be integrated in the direct drives.

Finally, there are also provided seals for sealing the bearing shells with respect to the melt, the seals having to be configured accordingly for relatively high pressures at the discharge side, and consequently high-pressure side, that is to say, preferably extending over a longer axial sealing path relative to the extruder shaft than at the inlet side.

In particular, the seals may also be in the form of cascade seals in order to be able to take up the pressures, particularly at the outlet or discharge side, which may be, for example, in the order of magnitude of up to 60 bar during normal operation and up to 150 bar during heavy-load operation, it being possible for thermal loads of up to 300° C. and more to occur.

In principle, it would also be possible to arrange the two motors at the same side, for example, the inlet or discharge side of the screw extruder, in that case the two synchronization and torsion transmission devices which are associated near the inlet side and near the discharge side preferably being provided in the form of gear-wheels.

Finally, it would also be possible, for example, in a double-screw extruder, to arrange one motor at the inlet side and the other motor at the discharge side of the same extruder shaft, preferably to connect it thereto with direct driving, a second extruder screw being connected and driven via the two synchronization and torsion transmission devices mentioned in the form of two pairs of gear-wheels which are associated with the inlet side and discharge side, respectively.

Figure 1A:
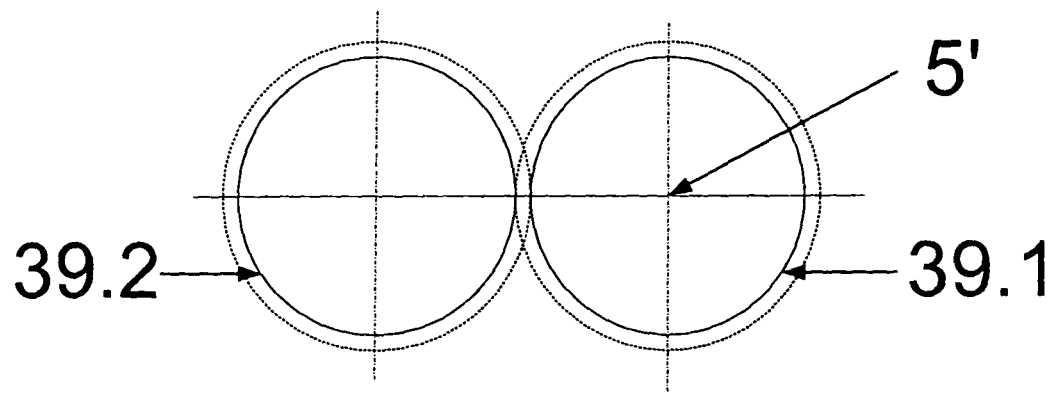
Figure 6:
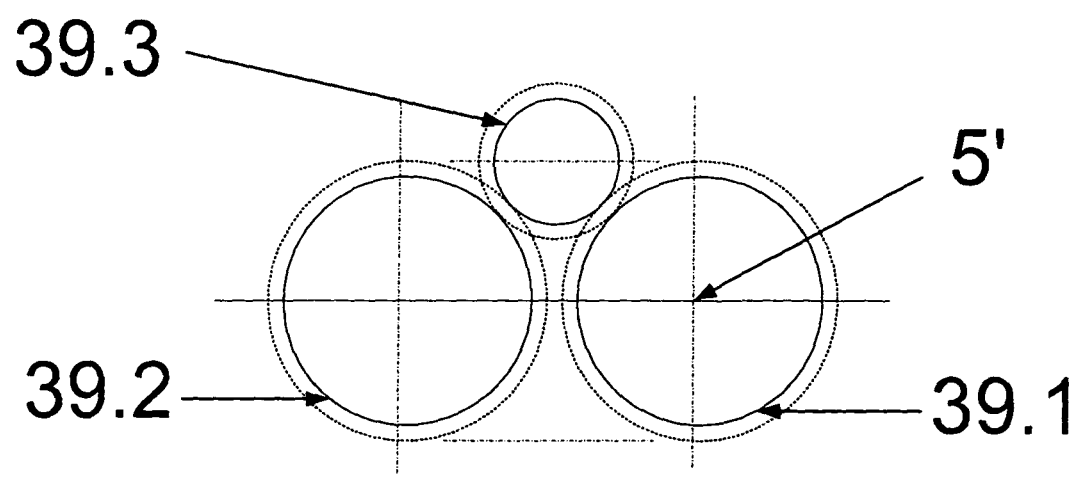
Figure 2:
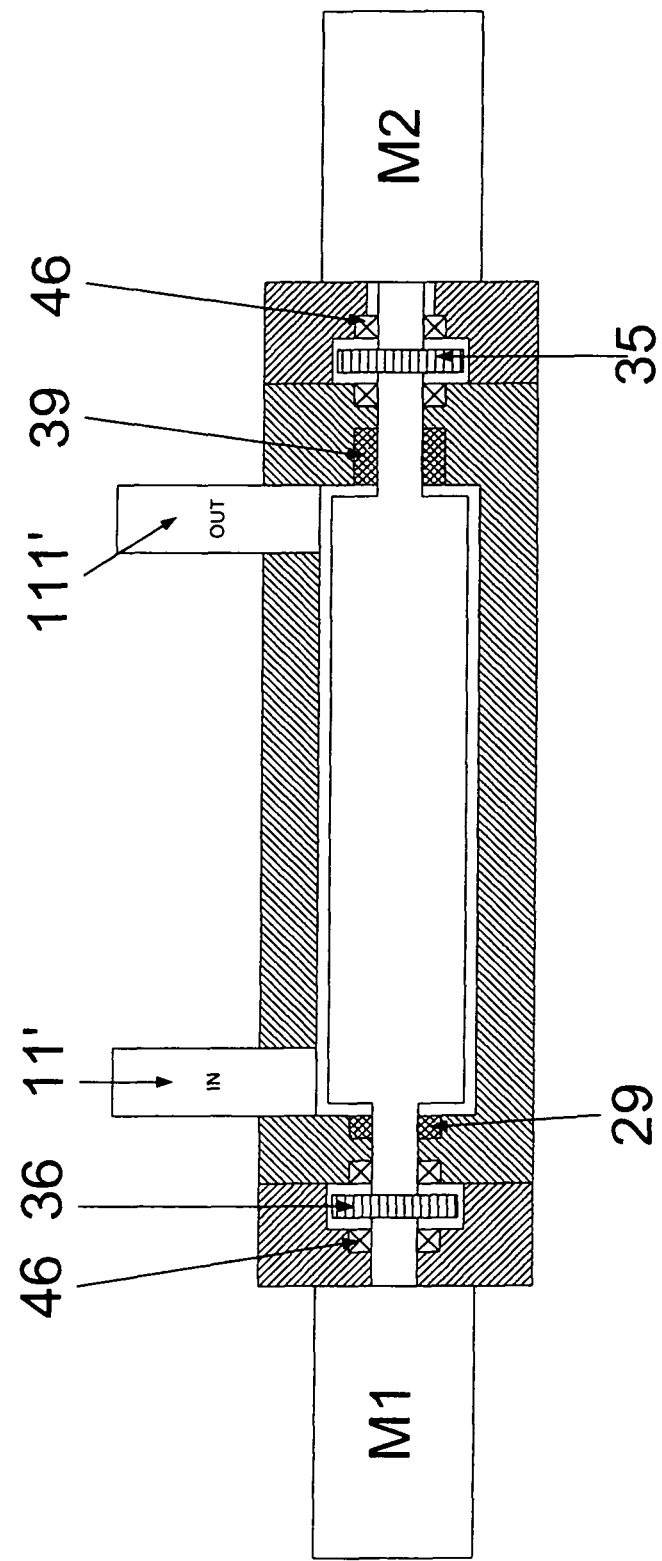
Figure 3:
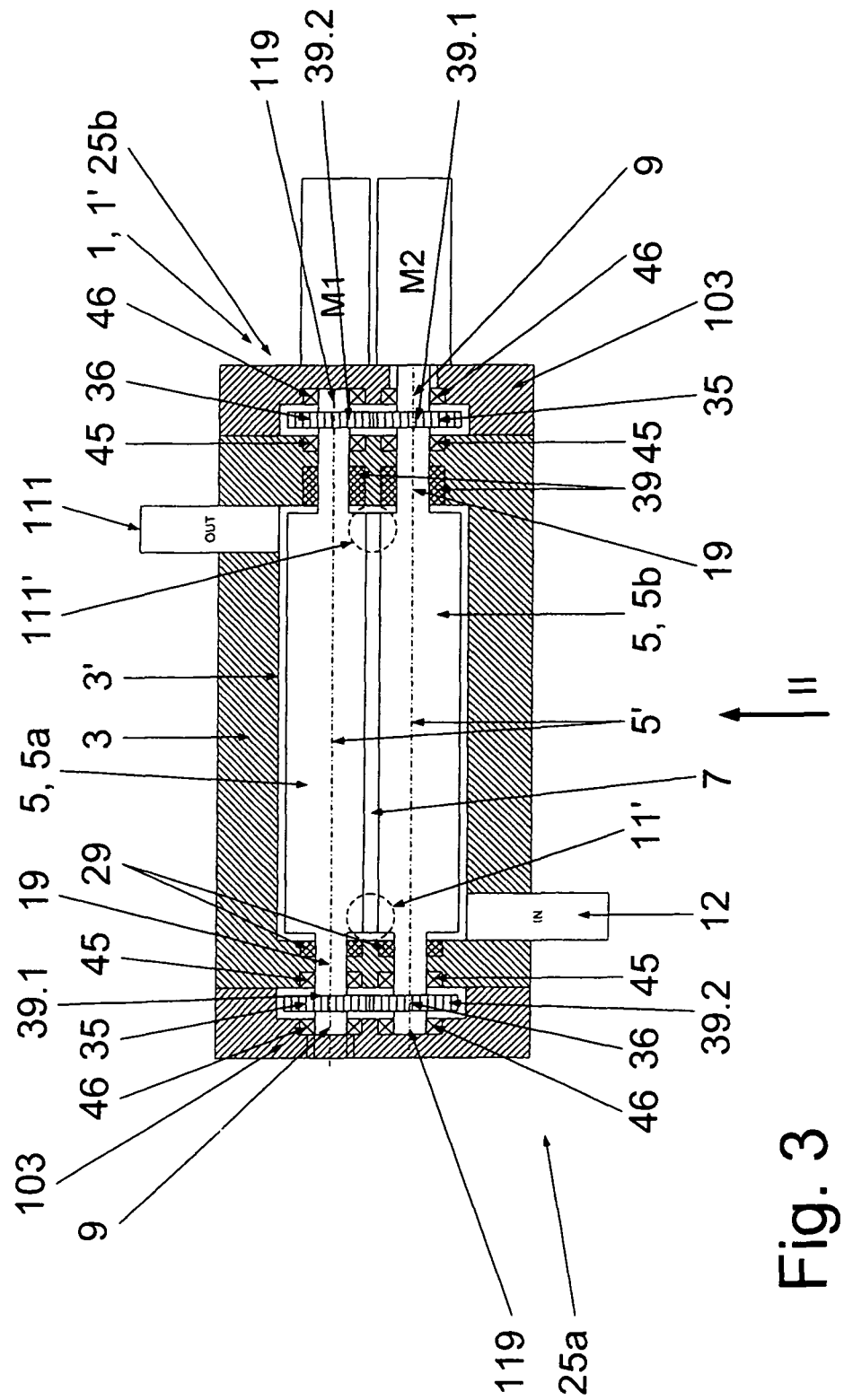
Figure 4:
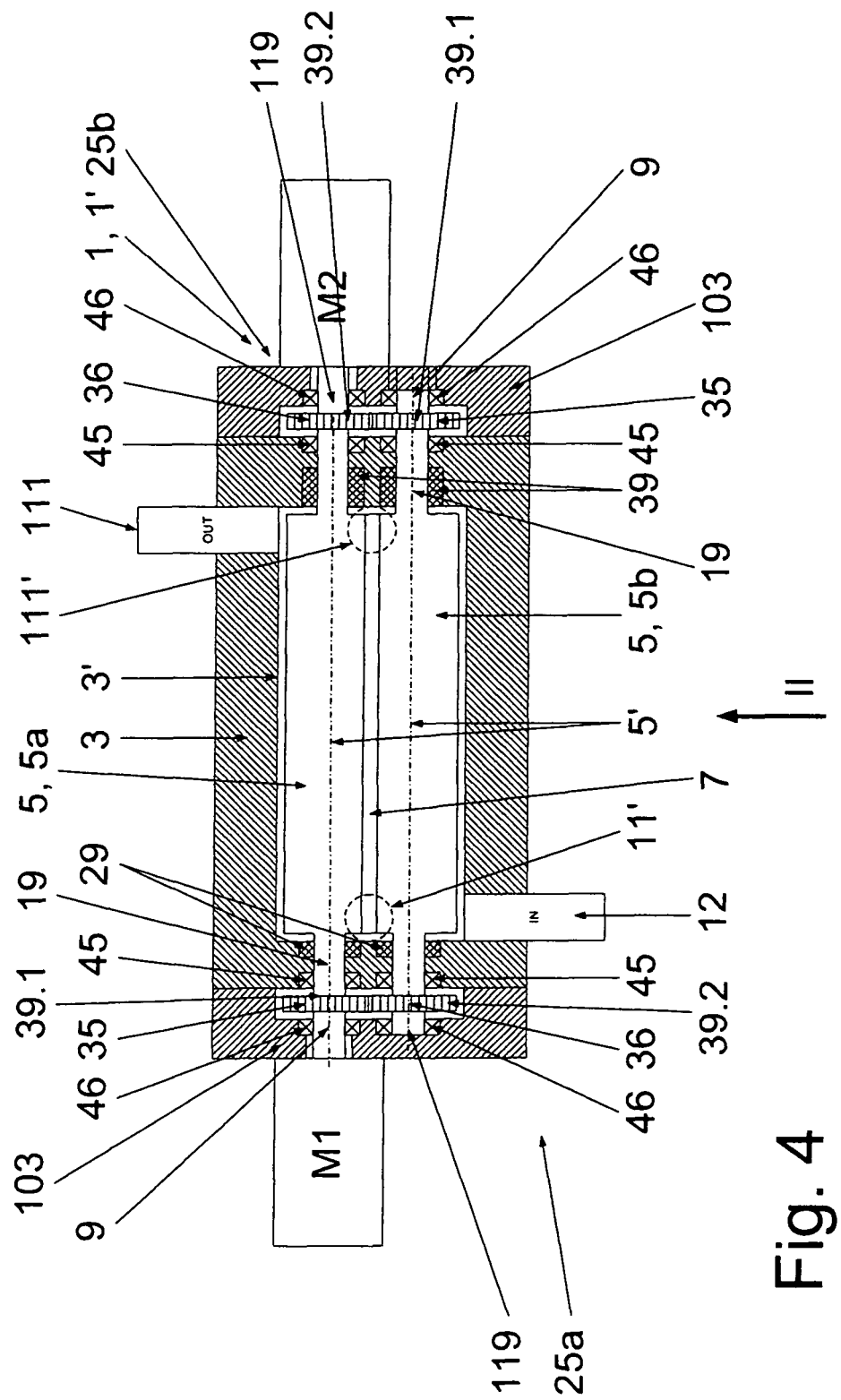
Figure 5:
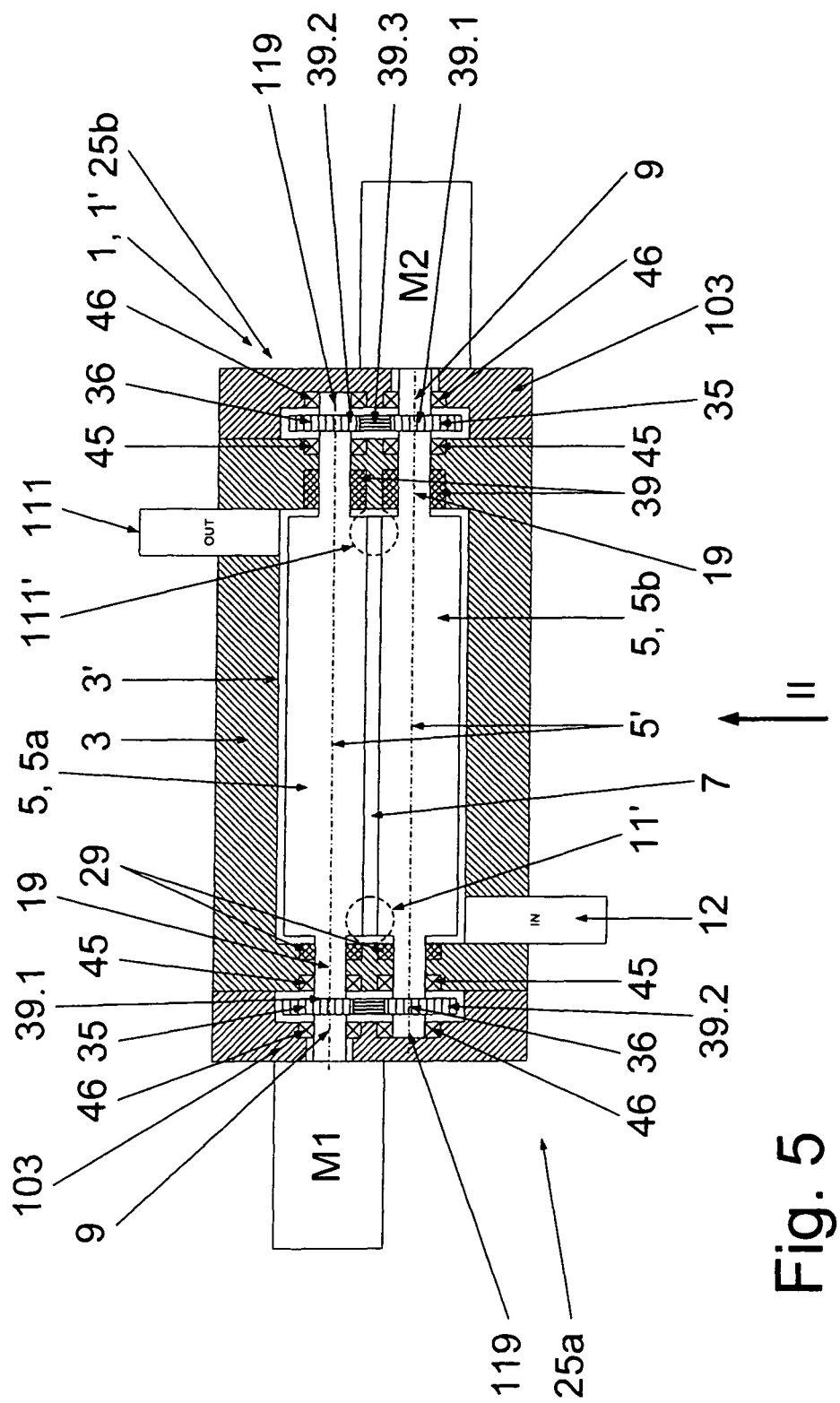
Figure 7:
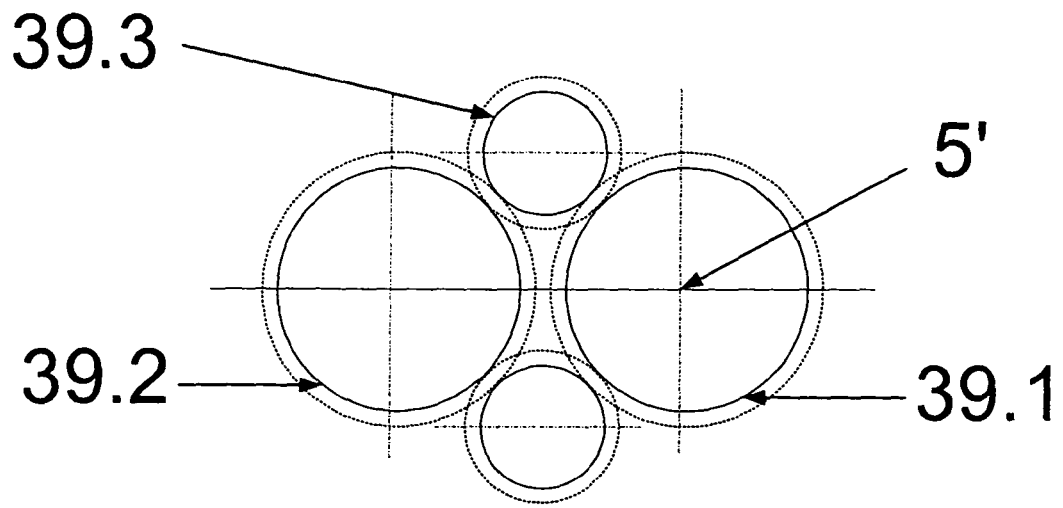
Figure 8:
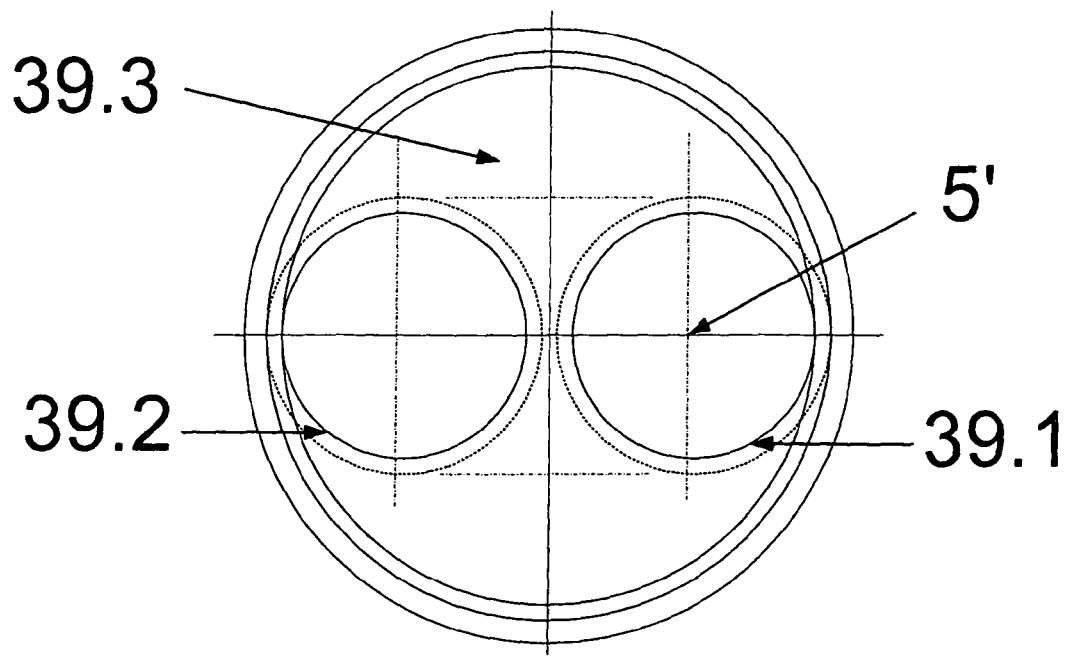

The invention is described in greater detail below with reference to embodiments. The drawings show the following in detail:

FIG. 1: is a top view of a first schematic embodiment of a multiple-screw extruder according to the invention in the form of a double-screw extruder having two extruder screws which are arranged parallel with each other;

FIG. 1a: is a partially cross-sectioned illustration of the two mutually engaging gear-wheels which are arranged on corresponding shafts of the extruder screws driven with each other both at the inlet side and at the discharge side;

FIG. 2: is a view rotated through 90° in accordance with the arrow II in FIG. 1 with an inlet and discharge opening provided as an alternative;

FIG. 3: shows an embodiment which is modified with respect to FIG. 1 and in which the two motors are arranged at the same side of the screw extruder;

FIG. 4 shows a further modified embodiment, in which the two motors are provided at the two opposite end faces of an individual extruder screw and the second extruder screw is connected at the inlet side and discharge side via a synchronization and/or torsion transmission device;

FIG. 5: shows a modified embodiment, in which there are driven together not two contra-rotating extruders but instead two synchronous extruders using at least one or, for example, two additionally provided redirecting pinion gears;

FIG. 6: is a cross-section view for clarifying the drive connection between the two extruder screws using a redirecting pinion gear;

FIG. 7: is an illustration corresponding to FIG. 6 using two redirecting pinion gears; and FIG. 8: is another illustration relating to a synchronous extruder using an internally-toothed gear-wheel.

FIGS. 1 and 2 show a first schematic embodiment.

In the construction variant according to FIG. 1, there is shown a multiple-screw extruder 1 which is constructed in the manner of a double-screw extruder 1' in the embodiment illustrated.

The multiple-screw extruder 1 comprises a housing 3, in the longitudinal direction of which there are arranged two screws 5, that is to say, a first extruder screw 5a and a second extruder screw 5b, which have screw axes 5' which extend parallel with each other in the embodiment illustrated.

The screws 5 are in engagement with each other, that is to say, in a so-called engagement portion 7, in which there are constructed the screw threads which are generally formed on the screws, extend helically and are not shown in greater detail in the drawings.

In other words, the screws 5 comprise in known manner a so-called screw core, on which a screw thread which protrudes above the screw core in a radial direction is formed so as to extend in a peripheral direction. Consequently, one screw thread engages in the intermediate space between two helix portions of a screw thread of an adjacent screw, that is to say, without any contact.

In the embodiment illustrated, therefore, the screw bodies (which are also sometimes referred to as the screw core) are constructed so as to be cylindrical. In a different manner, the screws or at least the screw bodies could also be constructed so as to be slightly conical so that the screw axes 5' are not orientated parallel with each other but are instead orientated at an acute angle relative to each other generally of only a few degrees. The screws, that is to say, the screw bodies or the so-called screw cores, are then formed in a slightly conical manner so that the associated central or rotation axes 5' in the embodiment which is not shown in greater detail in the Figures then define an acute angle of, for example, less than 20° (in particular less than 15° or less than) 10°). In the embodiment in FIG. 1, however, the central axes 5' are parallel with each other.

The granulate to be processed can be supplied to the housing interior 3', for example, via a supply channel 11, which granulate is then provided by the screws and is conveyed by the contra-rotating rotation movement of the co-operating screws 5 along the screws 5 to the outlet side, that is to say, to an outlet channel 111 at the discharge side where the melt is discharged.

In other words, therefore, FIG. 1 shows a double-screw extruder which comprises a housing 3 having a housing interior 3' in the form of two housing holes which are provided at least in a portion of the housing 3. Those housing holes overlap at least in a partial axial length of the housing 3, forming the engagement portion 7 mentioned, one of the extruder screws 5 mentioned, that is to say, the extruder screw 5a or 5b in the embodiment illustrated, being arranged in each of the two housing holes, respectively.

In the embodiment illustrated according to FIGS. 1 and 2, the first extruder screw 5a is driven at the inlet side 25a with a motor M1 associated therewith, whereas the second extruder screw 5b is driven by means of a motor M2 at the discharge side 25b of the double-screw extruder. Those motors M1 and M2 comprise in the embodiment illustrated electric motors which can be controlled, for example, by means of an electronic control device (not shown in greater detail).

In the embodiment shown according to FIG. 1, the two screws 5a, 5b each have a drive shaft 9 which is arranged in corresponding housing holes and sealed at those locations. That drive shaft 9 simultaneously constitutes the drive shaft 19 which may comprise the motor output shaft. In other words, the motors M1 and M2 are directly connected to the screw 5a or 5b which is driven thereby rigidly via the drive shaft 19 or the drive shaft 9 or the shafts 19 already constitute the rotor of a direct drive constructed in this manner. In those embodiments according to FIGS. 1 and 2 and the subsequent embodiments according to FIGS. 3 and 4, therefore, the two motors M1 and M2 drive the two extruder screws 5a and 5b in opposite directions of rotation. In this regard, they are so-called "contra-rotating extruders".

However, it can also be seen from the drawing that the extruder screw 5a, 5b at the motor side is driven not only via a drive shaft 9 or a drive shaft 19 (coming from the motor), but instead that, at the opposite end face, the extruder screw 5a, 5b merges at the non-driven side thereof into an extended bearing shaft or stub bearing 119 which also serves to support the extruder screw, on the one hand, and to bring about the synchronization and/or torsion transmission, on the other hand, which will be further discussed below.

It can be seen in the drawings that corresponding seals have to be provided in order to seal the bearing shells with respect to the melt, that is to say, with respect to the extruder housing interior 3'. For instance, the drive axle 9 or the drive shaft 19 is sealed at the inlet side 25a by means of an inlet-side seal 29, that seal 29 preferably being positioned on the drive shaft 9, that is to say, on the drive shaft 19, directly beside the housing interior 3'. The non-driven stub shaft 119 of the adjacent second extruder screw 5b, which shaft 119 is used for bearing, is also sealed at the inlet side 25a by means of such an inlet-side seal 29 with respect to the housing interior, that is to say, the melt, also preferably being positioned on the stub axle 119 directly beside the housing interior 3.

There are also provided, at the discharge or high-pressure side, corresponding shaft seals 39 which are accordingly configured so as to withstand high pressure and which also have to withstand the thermal loads occurring of, for example, up to 300° C. The pressures may reach 60 bar during normal operation and 150 bar, for example, during high-load operation. Therefore, the seals 39 which are provided at the discharge side 25b for the non-driven stub axle 119 of the first extruder screw 5a and for the drive shaft 9 or the drive shaft 19 of the second motor M2 are illustrated over a relatively large axial length. In this instance, for example, cascade seals can also be used, which is known in principle.

Those seals are also preferably arranged so as to be positioned on the shafts 9, 19 or 119 directly beside the housing interior 3'.

There will be further discussed below bearings for the shafts, a synchronization and a torsion transmission device.

As can be seen from FIGS. 1, 1a and 2, for example, the drive shaft 9 or drive shaft 19 which is associated with the first motor M1 at the inlet side 25a and which has a first torsion support 35 is preferably provided in the form of a gear-wheel 39.1 which is arranged in a rotationally secure manner on the drive shaft 9 or the drive shaft 19 and which co-operates, particularly meshes, with a transmission-side torsion support 36 preferably also in the form of another gear-wheel 39.2 which is arranged in a rotationally secure manner on the stub shaft 119 of the second extruder screw (opposite the motor M2) and thereby also brings about a desired synchronization between the two extruder screws so that both extruder screws 5a and 5b are driven at the same speed, that is to say, the same rotational speed, but in opposite directions of rotation.

An identical device is also provided at the discharge side 25b. A drive-side torsion support 35 for the drive shaft 9 driven by the motor M2 or the driven drive axle 19 is also provided at that location for the driven second extruder screw 5b, again preferably also in the form of a gear-wheel which rotates in a rotationally secure manner and which co-operates, in particular meshes, with a transmission-side torsion support 36 at the non-driven end in the form of the stub shaft 119 of the first extruder screw 5a in order also to implement in this instance a force transmission device in the form of a synchronization device and a torsion transmission device between the two extruder screws. The two gear-wheels 39.1 and 39.2 which engage with each other and which are illustrated in FIG. 1a are again also used in this instance for the synchronization and torsion transmission device 35, 36.

Beside those transmission-side and drive-side torsion supports 35, 36, which are also sometimes referred to below as synchronization and torsion transmission devices, there are provided at both sides inner screw bearings 45 (which are located nearer the housing interior 3') and outer screw bearings 46 (that is to say, which are located remote from the housing interior 3') on the drive shafts 9, that is to say, both on the drive shafts 19 and also on the non-driven stub shafts 119.

FIG. 1 shows that, for example, the inlet channel 11 for supplying the granulate to be provided at the inlet side is provided in such a manner that it provides a connection with respect to the housing interior 3' in a radial direction relative to the extruder screws (or at least with a predominantly radial component), that is to say, located at least substantially in a plane in which the central axes 5' of the two extruder screws 5a, 5b are also located. Accordingly, the discharge channel 11 at the discharge side is again preferably also provided in a radial direction relative to the extruder screws (or with a relatively large component at least in the radial direction), that discharge channel 111 being located in the embodiment illustrated at the opposite longitudinal side of the screw extruder, that is to say, opposite the inlet channel 11.

An alternative inlet and discharge channel 11', 111' which is reproduced in FIG. 2 as an alternative construction is illustrated with broken lines in FIG. 1.

This shows that the inlet channel 11' and the discharge channel 111' extend in a vertical direction or at least predominantly in a vertical direction, that is to say, the inlet channel preferably leads in a downward direction to the housing interior which is located below and, at the discharge side, the discharge channel 111 also at least predominantly extending in a vertical direction or preferably extending exactly in a vertical direction discharges the extruder material provided outwards.

With reference to the embodiment according to FIG. 3, it is shown that, unlike FIG. 1, both drive motors M1 and M2 can be arranged at the same side of the screw extruder, for example, at the discharge side 25b in accordance with the embodiment according to FIG. 2. In the same manner, the two motors M1 and M2 can also both be provided at the inlet side 25a so as to be associated with the two extruder screws 5a, 5b. The other structure otherwise corresponds to the embodiment according to FIGS. 1 and 2. Should the motor housings have a larger diameter than the spacing of the two extruder axes, there could also be selected an arrangement in which one drive shaft 9, that is to say, one drive shaft 119, is extended in an axial direction so that one motor further becomes arranged so as to be offset in a corresponding axial length of the other motor with respect to the other motor, that is to say, at the height of the motor which is located nearer the extruder housing consequently only the drive shaft 9 or the drive shaft 119 extends past that motor.

With reference to the embodiment according to FIG. 4, it is further schematically shown that both motors M1 and M2 at the inlet and the discharge side can be associated with a single extruder shaft, for example, the extruder shaft 5a, the second screw extruder 5b being connected via the synchronization and/or torsion transmission device 35, 36 which is provided at the inlet and discharge side and thereby also being driven in a synchronous manner.

In both cases, additional gear-wheels 39.1 and 39.2 are shown therefor, with one gear-wheel 39.1 being arranged in a rotationally secure manner, for example, for the drive shaft 9, 19, that is to say, is connected in a rotationally secure manner to one screw 5a and the second gear-wheel 39.2 which engages therewith is connected to the second screw 5b in a rotationally secure manner, for example, in that it is positioned in the region of the stub axle 119.

Owing to the above-mentioned gear-wheels 39.1 and 39.2 which engage with each other, there will be ensured a forced relative orientation including torsion compensation of the screws so that the screw threads cannot collide with each other.

It can also be seen from the embodiments that the housing 3 comprises a central housing portion having an end-face end region, in which the drive shaft 9 or the drive axle 19 and the non-driven stub axle 119 are supported by the bearings 45 described and are sealed with respect to the extruder interior. A cover or housing extension 103, in which the synchronization and torsion transmission device 35, 36 and, via the outer bearings 46, the end of the non-driven stub axle 119 or the nearest bearings 46 at the motor side for bearing the shafts in a corresponding receiving space are accommodated, subsequently adjoins the inlet and discharge side by means of the seals 29, 39 in axial extension. The bearing 45 which is located at the inner side relative to the synchronization and torsion transmission device 35, 36, that is to say, which is located nearer the interior 3' of the extruder arrangement, is preferably arranged directly adjacent to the end face 33 of the housing portion 3 (with the cover-like housing extension 103 removed).

Reference is made below to FIG. 5 which shows an embodiment of a double-screw extruder that is comparable in terms of the basic construction, with the double-screw extruder shown in FIG. 5 not having, unlike in FIG. 1, a so-called contra-rotating extruder (in which the two extruder screws are driven in opposite directions of rotation) but instead has a synchronous extruder, in which the two extruder screws 5*a* and 5*b* are driven not only at the same speed but above all in the same direction of rotation with respect to each other.

This can be carried out according to FIG. 5 by a third gear-wheel 39.3, the synchronization and torsion transmission devices 35, 36 in the form of the preferably used gear-wheels 39.1 and 39.2 not meshing with each other, unlike in the embodiment according to FIGS. 1 and 2, but instead being arranged at least with small spacing from each other so that a driving connection is brought about from one gear-wheel 39.1, via the intermediate gear-wheel or redirecting pinion gear 39.3, to the next gear-wheel 39.3 which is connected to the second extruder shaft in a rotationally secure manner. This function is shown as a cross-section in accordance with FIG. 6 for the synchronization and torsion transmission device 35, 36 both at the inlet and at the discharge side.

A particularly symmetrical synchronization and torsion transmission is brought about if, for example, in the embodiment according to FIG. 5, unlike the example according to FIG. 6, there is further used a second redirecting or intermediate gear-wheel 39.3', that is to say, an additional redirecting pinion gear 39.3', so that there is provided, opposite the first pinion gear 39.3 at the other side of the two gear-wheels 39.1 and 39.2, an additional pinion gear 39.3' which also meshes with the two gear-wheels 39.1 and 39.2. The two gear-wheels 39.1 and 39.2 are located themselves out of engagement with one another.

In place of that embodiment, it is also possible to implement a symmetrical force transmission and therefore optimum synchronization and torsion transmission in that, for example, unlike FIG. 7, there is used an internally-toothed gear-wheel 39.3" which meshes with the externally-toothed gear-wheels 39.1 and 39.2, preferably at the opposite regions thereof (that is to say, regions located further away from each other). In that case, there would preferably be provided two such internally-toothed gear-wheels, both at the inlet side and at the discharge side. However, even mixed systems would be possible so that, for example, there are used an internally-toothed gear-wheel at the inlet side or at the discharge side and, at the opposite side, respectively, that is to say, for example, at the discharge side or the inlet side according to FIG. 6 or 7, only one redirecting pinion gear or, for example, two redirecting pinion gears which mesh with the two synchronous driven gear-wheels 39.1 and 39.2 (that is to say, moving in the same direction of rotation).

The operations described with reference to FIGS. 6 and 7 for a synchronous extruder can also be used in the embodiments according to FIGS. 3 and 4.

As is evident from the described embodiments of the invention, the motors are rigidly connected to the extruder screw 5*a* or 5*b*, respectively. If the motors are arranged beside each other as in the embodiment according to FIG. 3, the diameter of the individual motors may correspond to the axial spacing of the screws at the maximum when the housing structure is symmetrical. Otherwise, the motors would have to be arranged with different axial spacing with lateral displacement relative to each other so that a motor housing can in principle also have a diameter which is greater than the axial spacing of two adjacent screws if the drive shaft which extends past the motor housing and which leads to a second motor which is provided with axial displacement has a smaller outer diameter in that lateral region.

For example, in the case of a double-screw extruder, it would also be possible to drive the two motors which are each associated with a separate extruder screw by means of a cardan shaft. The diameter of the individual motors can thereby often be greater than the axial spacing of the screws.

In a simplified embodiment, it would also be possible to connect only one motor to an extruder screw via a cardan shaft, whereas the second motor is directly connected to the extruder screw.

The invention has been described with reference to a double extruder. However, it may also be a multiple extruder which comprises more than two extruder screws. In that case, the implementation variants described may be extended as desired. Consequently, it is also possible to have a multiple-screw extruder which comprises at least two extruder screws in addition to at least one additional extruder screw, in a construction as has been explained with reference to FIGS. 1 to 4.

The various embodiments have been explained for the situation that there are used for the synchronization and torsion transmission device 35, 36 either the gear-wheels 39.1 and 39.2 which mesh directly with each other (in extruder screws driven contra-rotatingly) or the gear-wheels 39.1, 39.2 and 39.3 or 39.3' or 39.3" (in extruder screws which are driven synchronously). Irrespective of that, however, it is also possible to use all other technical means to bring about a corresponding synchronization and torsion transmission device 35, 36, for example, in the form of chains, belts or other suitable synchronization and drive connections.

The invention claimed is:

1. Multiple-screw extruder comprising:
   a housing having an inlet at an inlet side and an outlet at an outlet side,
   a plurality of housing holes provided at least in a portion of the housing,
   the housing holes overlapping at least in a partial axial length of the housing,
   at least first and second co-operating extruder screws rotatably arranged in the plurality of housing holes, the at least first and second extruder screws being rotatably mounted both at the housing inlet side and at the housing outlet side, the first and second extruder screws being structured to convey material along the first and second extruder screws from the housing inlet to the housing outlet by cooperative rotation of the first and second extruder screws,
   at least first and second motors provided to drive the first and second extruder screws,
   a first synchronization and torsion transmission device disposed at the inlet side and coupled to the first and second extruder screws,
   a second synchronization and torsion transmission device disposed at the outlet side and coupled to the first and second extruder screws, the first synchronization and torsion transmission devices and the second synchronization and torsion transmission device being arranged to achieve rotational synchronization of the at least first and second co-operating extruder screws,
   at least first and second shafts being provided at the inlet side, the first shaft being connected to or part of the first extruder screw and rotating therewith, the second shaft being connected to or part of the second extruder screw and rotating therewith, portions of the first and second shafts protruding at opposite end faces of the first and second extruder screws being mounted in bearings on both the inlet side and the outlet side, the first and second shafts being interconnected via the first synchronization and torsion transmission device provided at the inlet side and also being interconnected via the second synchronization and torsion transmission device provided at the outlet side.

2. Multiple-screw extruder according to claim 1, wherein the first motor drives the first shaft at the inlet side and the second motor drives the first shaft at the outlet side, and the second extruder screw is connected to the first synchronization and torsion transmission device at the inlet side and is connected to the second synchronization and torsion transmission device at the outlet side.

3. Multiple-screw extruder according to claim 1, wherein the first and second motors are both arranged at the inlet side or are both arranged at the outlet side, the first motor being drivingly connected to the first shaft and the second motor being drivingly connected to the second shaft.

4. Multiple-screw extruder according to claim 1, wherein the first motor is directly connected to the first shaft rigidly and/or without any gearing, in the form of a direct drive, the first motor having a motor shaft that axially extends or merges into the first shaft.

5. Multiple-screw extruder according to claim 1, wherein the housing has an interior, and the first and second shafts comprise bearing shells that are sealed with respect to the housing interior by seals on each end of each shaft.

6. Multiple-screw extruder according to claim 1, wherein the housing has an interior, and the first and second extruder screws have at non-driving sides thereof a drive stub shaft whose bearing shells are sealed with respect to the housing interior by seals.

7. Multiple-screw extruder according to claim 5, wherein the seals are configured at the outlet side to take up increased pressures and/or thermal loads.

8. Multiple-screw extruder according to claim 7, wherein the seals at the outlet side comprise cascade seals and/or cooling gap seals.

9. Multiple-screw extruder according to claim 1, wherein the housing has an interior, and the extruder further comprises seals on the first and second shafts that are arranged adjacent to the housing interior.

10. Multiple-screw extruder according to claim 1, wherein the first synchronization and torsion transmission device is arranged in the region of the first shaft, to drivingly connect the first extruder screw to the first motor.

11. Multiple-screw extruder according to claim 1, further comprising a stub axle which protrudes axially at an end face at a non-driven side of the first extruder screw in an axial direction relative to the bearing associated with the first extruder screw.

12. Multiple-screw extruder according to claim 10, further comprising a housing extension which is fitted to end faces of the housing, the first synchronization and torsion transmission device being disposed in the housing extension.

13. Multiple-screw extruder according to claim 12, further comprising an outermost bearing for the first shaft and provided in the region of the housing extension, and another bearing which is located nearer the interior of the housing at the opposite side of the first synchronization and torsion transmission device is accommodated in an end-face passage region of the housing.

14. Multiple-screw extruder according to claim 1, wherein the first and second extruder screws are connected by the first synchronization and torsion transmission device which comprises a rotating belt or chain.

15. Multiple-screw extruder according to claim 1, wherein the first and second extruder screws which are driven to contra-rotate in opposite directions of rotation by the first and second motors respectively.

16. Multiple-screw extruder according to claim 1, wherein the first and second synchronization and torsion transmission devices comprise gear-wheels including a first gear-wheel which meshes with a second gear-wheel arranged at the same height in a rotationally secure manner on an adjacent one of the first and second extruder screws, wherein the gear-wheels are arranged in a rotationally secure manner at the inlet side and at the outlet side respectively both on a motor-side drive shaft and on a stub shaft which is located opposite relative to a drive side.

17. Multiple-screw extruder according to claim 1, wherein the first and second motors are arranged to synchronously drive the first and second extruder screws in the same direction of rotation.

18. Multiple-screw extruder according to claim 1, wherein the first and second synchronization and torsion transmission devices comprise gear-wheels including a first gear-wheel arranged in a rotationally secure manner at the inlet side and/or at the outlet side respectively on a drive shaft and/or stub shaft, the first gear-wheel being in engagement with a second gear-wheel arranged at the same height in a rotationally secure manner on an adjacent one of the first and second extruder screws,
at least one of the first and second gear-wheel comprising internal teeth that engage with a least one redirecting pinion gear.

19. Multiple-screw extruder according to claim 1, wherein the first and second synchronization and torsion transmission devices are arranged in an axially displaced manner in order to drive co-operating adjacent first and second screws in an axial direction of the first and second shafts, to not overlap each other when viewed perpendicularly relative to the first and second shafts.

20. Multiple-screw extruder according to claim 1, wherein the first shaft comprises a cardan shaft that drivingly connects the first motor to the first extruder screw.

21. Multiple-screw extruder comprising:
a housing having an inlet side and an outlet side, the housing defining a plurality of housing holes overlapping at least in a partial axial length of the housing,
a first extruder screw arranged in the housing holes and rotatably mounted to the housing at both the inlet side and the outlet side,
a first rotatable shaft provided at the inlet side, the first shaft arranged to rotate with the first extruder screw,
a second extruder screw arranged in the housing holes and rotatably mounted to the housing at both the inlet side and at the outlet side,
a second rotatable shaft provided at the inlet side, the second shaft arranged to rotate with the second screw,
a first rotational synchronizer disposed at the inlet side and interconnecting the first and second rotatable shafts,
a second rotational synchronizer disposed at the outlet side and interconnecting the first and second rotatable shafts, and
at least one drive motor arranged to rotate the first and second shafts and screws,
the first and second rotational synchronizers being arranged to synchronize rotation of the second shaft and extruder screw with rotation of the first shaft and extruder screw to thereby cooperatively rotate the first and second screws together to discharge melt to the housing outlet side, while preventing mechanical rotational interference therebetween; and
bearings and seals on both the inlet side and outlet side that rotatably support the first and second screws.

22. The multiple-screw extruder of claim 21 wherein the first rotatable shaft is part of the first extruder screw, and the second rotatable shaft is part of the second extruder screw.

23. The multiple-screw extruder of claim 21 comprising first and second drive motors, the first drive motor disposed on the inlet side, the second drive motor disposed on the outlet side, the first and second drive motors both being rotationally coupled to drive the first rotatable shaft and first extruder screw.

24. The multiple-screw extruder of claim 23 wherein the first drive motor is directly mechanically coupled to the first rotatable shaft to thereby rotate the first rotatable shaft and first extruder screw, and the second drive motor is directly mechanically coupled to the second rotatable shaft to thereby rotate the second rotatable shaft and second extruder screw, and the first and second rotational synchronizers synchronize rotation of the first extruder screw with rotation of the second extruder screw so that the first and second extruder screws are driven to rotate together at the same speed.

25. The multiple-screw extruder of claim 21 further comprising:
   first and second bearings rotatably supporting the first rotatable shaft and first extruder screw;
   third and fourth bearings rotatably supporting the second rotatable shaft and second extruder screw;
   the first and third bearings being disposed at the inlet side, the second and fourth bearings being disposed at the outlet side;
   first and second seals for the first rotatable shaft and first extruder screw;
   third and fourth seals for the second rotatable shaft and second extruder screw;
   the first and third seals being disposed at the inlet side, the second and fourth seals being disposed at the outlet side;
   wherein the housing defines an internal space therein containing hot melt and the first, second, third and fourth seals are disposed nearer to the internal space of the housing than the first, second, third and fourth bearings, respectively, to thereby protect the first, second, third and fourth bearings from the hot melt.

26. The multiple-screw extruder of claim 1 further comprising:
   first and second bearings rotatably supporting the first shaft and first extruder screw;
   third and fourth bearings rotatably supporting the second shaft and second extruder screw;
   the first and third bearings being disposed at the inlet side, the second and fourth bearings being disposed at the outlet side;
   first and second seals for the first shaft and first extruder screw;
   third and fourth seals for the second shaft and second extruder screw;
   the first and third seals being disposed at the inlet side, the second and fourth seals being disposed at the outlet side;
   wherein the housing defines an internal space therein containing hot melt and the first, second, third and fourth seals are disposed nearer to the internal space of the housing than the first, second, third and fourth bearings, respectively, to thereby protect the first, second, third and fourth bearings from the hot melt.

* * * * *